(12) United States Patent
Unno

(10) Patent No.: US 9,191,550 B2
(45) Date of Patent: Nov. 17, 2015

(54) IMAGE FORMING APPARATUS AND METHOD FOR PERFORMING GRADATION CORRECTION IN AN IMAGE FORMING APPARATUS AND PROGRAM

(71) Applicant: CANON KABUSHIKI KAISHA, Tokyo (JP)

(72) Inventor: Koichi Unno, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 13/719,493

(22) Filed: Dec. 19, 2012

(65) Prior Publication Data
US 2013/0176579 A1    Jul. 11, 2013

(30) Foreign Application Priority Data

Dec. 22, 2011  (JP) ................................. 2011-281690
Nov. 2, 2012   (JP) ................................. 2012-242714

(51) Int. Cl.
```
G03F 3/08     (2006.01)
H04N 1/407    (2006.01)
H04N 1/46     (2006.01)
H04N 1/40     (2006.01)
G03G 15/20    (2006.01)
G03G 15/00    (2006.01)
H04N 1/00     (2006.01)
```

(52) U.S. Cl.
CPC ............ *H04N 1/46* (2013.01); *G03G 15/2039* (2013.01); *G03G 15/5062* (2013.01); *H04N 1/40006* (2013.01); *H04N 1/407* (2013.01); *H04N 1/4078* (2013.01); *G03G 2215/00084* (2013.01); *H04N 1/00002* (2013.01)

(58) Field of Classification Search
USPC .................................. 358/1.9, 504, 518–523
See application file for complete search history.

(56) References Cited

U.S. PATENT DOCUMENTS 6,088,549 A  *  7/2000  Kagawa et al. ................. 399/67
6,965,462 B1 * 11/2005  Henderson et al. ........... 358/504
7,003,237 B2 *  2/2006  Miyamoto et al. .............. 399/66

(Continued)

FOREIGN PATENT DOCUMENTS

JP    2001-119594 A       4/2001
JP    2006259142 A   *   9/2006

OTHER PUBLICATIONS

JPO Machine Translation of JP2006259142A.*

(Continued)

*Primary Examiner* — Richard Zhu
(74) *Attorney, Agent, or Firm* — Fitzpatrick, Cella, Harper & Scinto

(57) ABSTRACT

If the temperature of a fixing unit is not stable when automatic gradation correction is performed, an error occurs in gradation correction when a chart for gradation measurement is output. An image forming apparatus of the present invention is characterized by including a unit configured to transfer a toner image based on image data onto a sheet, to pass the sheet through a fixing unit, and to output a first chart, a unit configured to create a conversion table for gradation correction using a value obtained by reading the output first chart, and a stabilization processing unit configured to stabilize the fixing unit by outputting a second chart before outputting the first chart when creation of the conversion table for gradation correction is instructed, wherein the stabilization processing unit outputs the second chart in a number of sheets specified in advance by a user.

22 Claims, 18 Drawing Sheets

(56) References Cited

U.S. PATENT DOCUMENTS

| | | | |
|---|---|---|---|
| 7,142,332 B2* | 11/2006 | Degani et al. | 358/3.1 |
| 7,206,099 B2* | 4/2007 | Brewington et al. | 358/3.06 |
| 7,495,799 B2* | 2/2009 | Mongeon | 358/1.9 |
| 7,769,309 B2* | 8/2010 | Tomita et al. | 399/49 |
| 7,995,838 B2* | 8/2011 | Komiya et al. | 382/162 |
| 8,149,480 B2* | 4/2012 | Shiraishi | 358/504 |
| 2002/0159107 A1* | 10/2002 | Maruta et al. | 358/519 |
| 2003/0214657 A1* | 11/2003 | Stringham | 358/1.1 |
| 2004/0184830 A1* | 9/2004 | Miyamoto et al. | 399/66 |
| 2004/0207862 A1* | 10/2004 | Such et al. | 358/1.9 |
| 2004/0212816 A1* | 10/2004 | Tanabe et al. | 358/1.9 |
| 2007/0070455 A1 | 3/2007 | Mongeon | |
| 2007/0177232 A1* | 8/2007 | Takeuchi | 358/504 |
| 2007/0230978 A1 | 10/2007 | Zaima | |
| 2008/0145087 A1* | 6/2008 | Itou | 399/70 |
| 2008/0174834 A1* | 7/2008 | Ueda et al. | 358/488 |
| 2008/0175611 A1* | 7/2008 | Tomita et al. | 399/49 |
| 2009/0116073 A1* | 5/2009 | Nakamura | 358/3.23 |
| 2010/0008681 A1* | 1/2010 | Nagatsuka | 399/43 |
| 2011/0229173 A1* | 9/2011 | Nakayama | 399/53 |
| 2012/0038957 A1* | 2/2012 | Umezawa | 358/504 |
| 2012/0188596 A1* | 7/2012 | Niles et al. | 358/1.15 |

OTHER PUBLICATIONS

Office Action in Chinese Patent Application No. 201210568580.5, dated Jan. 30, 2015.

* cited by examiner

| | | |
|---|---|---|
| ADJUSTMENT TARGET SHEET | SHEET TYPE ID | 3 |
| FIXING PROCESS STABILIZATION PRINTING | OFF/ON | ON |
| FIXING PROCESS STABILIZATION PRINT SHEET | SHEET TYPE PRIORITY: 0<br>SHEET FEED CASSETTE PRIORITY: 1<br>ADJUSTMENT TARGET SHEET PRIORITY: 2 | 0 |
| FIXING PROCESS STABILIZATION SHEET FEED CASSETTE | 1~4 | 3 |
| FIXING PROCESS STABILIZATION SHEET | SHEET TYPE ID | 1 |

FIG.12

| SHEET FEED CASSETTE | SHEET SIZE | MAIN SCAN SIZE | SUB SCAN SIZE | SHEET TYPE ID |
|---|---|---|---|---|
| 1 | A4 | 297.0 | 210.0 | 1 |
| 2 | A3 | 297.0 | 420.0 | 3 |
| 3 | A4 | 297.0 | 210 | 2 |
| 4 | A3 | 297.0 | 420 | 1 |

FIG.13

| SHEET TYPE ID | NAME | BASIS WEIGHT | SURFACE PROPERTY | FORM | ADJUSTMENT VALUE | FIXING PROCESS STABILIZATION PG NUMBER | NUMBER OF PRINTED OUTPUT SHEETS FOR FIXING PROCESS STABILIZATION |
|---|---|---|---|---|---|---|---|
| 1 | "FOR IN-HOUSE USE" | 80 | HIGH QUALITY PAPER | STANDARD | 0 | 0 | 0 |
| 2 | "FOR FAX" | 64 | RECYCLED PAPER | STANDARD | 2 | 0 | 3 |
| 3 | "FOR PAMPHLET" | 140 | BOTH SIDES COATED PAPER | STANDARD | 2 | 1 | 1 |

IMAGE FORMING APPARATUS AND METHOD FOR PERFORMING GRADATION CORRECTION IN AN IMAGE FORMING APPARATUS AND PROGRAM

BACKGROUND OF THE INVENTION

1. Field of the Invention

The present invention relates to an image forming apparatus and a method for image forming and a program thereof and, particularly, to gradation correction when forming an image.

2. Description of the Related Art

The mainstream of the recent copy machine is a digital copy machine that performs digital processing on image data generated by reading a document with a scanner unit, transfers the image data to a printer unit, and prints the transferred image data. In the copy machine with such a configuration, if the gradation property of the image data generated by the scanner unit and the gradation property when output to a sheet in the printer unit are not adjusted, the gradation property in the duplicated document will be lost as a result. In view of this, various automatic gradation correction functions are proposed which adjust the gradation property in a duplicated document to be output when the document is duplicated.

The automatic gradation correction function is explained with reference to FIGS. 4 and 5. First, an image A 510 is created as a gradation measurement chart by a controller 501 of a copy machine and is stored in a memory within the controller 501 (steps 401 to 403). Then, the image A 510 stored in the memory is transferred to a printer unit 503 connected to the controller 501 and printed in the printer unit 503 and a printed document A 512 is output (step 404).

Next, the printed document A 512 is read by a scanner unit 504 connected to the controller 501 and an image A' 511 that is obtained is accumulated in the memory (steps 405 to 407). At this time, it may also be possible to accumulate predetermined target data in the memory in place of the image A' 511. The image A 510 and the image A' 511 (or target data) saved in the memory within the controller 501 are compared, and thus gradation difference data is calculated (step 408). Each process of steps 403 to 408 is repeated several times (step 409), and thereby a conversion table for gradation correction used at the time of output to the printer unit 503 is obtained (step 410).

The image data read by the scanner unit is converted by use of the gradation correction conversion table created in this manner, which makes it possible to reproduce the gradation of the original document when printing is performed in the printer unit 503. As the automatic gradation correction function, in addition to the method described above, there is a correction method that takes into consideration the difference between sheets used at the time of printing and such an automatic gradation correction function is described in Japanese Patent Laid-Open No. 2001-119594.

The above-described automatic gradation correction is based on the premise that printed matter is always output with the same printing characteristic when image data is printed in the printer unit. However, in general, the printing characteristic of the printer unit varies depending on the number of printed sheets and the printing interval and also varies depending on the use environment. As a result, there is a case where a variation in density occurs between the first several sheets and the several subsequent sheets of the printed matter. The reason is that the fixing temperature, when printing is performed in the printer unit, varies depending on the weather condition of the installation position, the printing time, etc., and therefore, it is no longer possible to perform gradation correction accurately. Consequently, in order to perform gradation correction more accurately, it is desirable to perform printing in a state in which variation in density due to the variation in the fixing temperature is suppressed.

SUMMARY OF THE INVENTION

An image processing device according to the present invention is characterized by comprising a sheet storage unit configured to store sheets, a transfer unit configured to transfer a toner image, based on image data, onto a sheet from the sheet storage unit, a fixing unit configured to fix the toner image onto the sheet, a conveying unit configured to convey a sheet, from the sheet storage unit, through the fixing unit, an outputting unit configured to output the sheet with the image formed thereupon as a first chart, a creating unit configured to create a conversion table for gradation correction using a value obtained by reading the output first chart, and a stabilization control unit configured to, in the case creation of a conversion table for gradation correction is instructed, perform stabilization control to stabilize the fixing temperature of the fixing unit by performing control to cause the conveying unit to convey a sheet through the fixing unit and to cause the outputting unit to output the sheet, before outputting the first chart, wherein the stabilization control is performed such that a predetermined number of sheets, specified in advance by a user, are output before the first chart is output.

According to the present invention, it is made possible to more efficiently perform automatic gradation correction with high precision.

Further features of the present invention will become apparent from the following description of exemplary embodiments (with reference to the attached drawings).

BRIEF DESCRIPTION OF THE DRAWING

FIG. 12 is a table showing an example of setting of automatic gradation correction operation;

FIG. 13 is a table showing an example of stored sheet information;

FIG. 14 is a table showing an example of sheet characteristic information;

FIG. 16 is an example of a UI screen for confirming and changing details of each set value of the sheet characteristic information;

DESCRIPTION OF THE EMBODIMENTS

Hereinafter, embodiments to embody the present invention are explained using the drawings.

Figure 1:
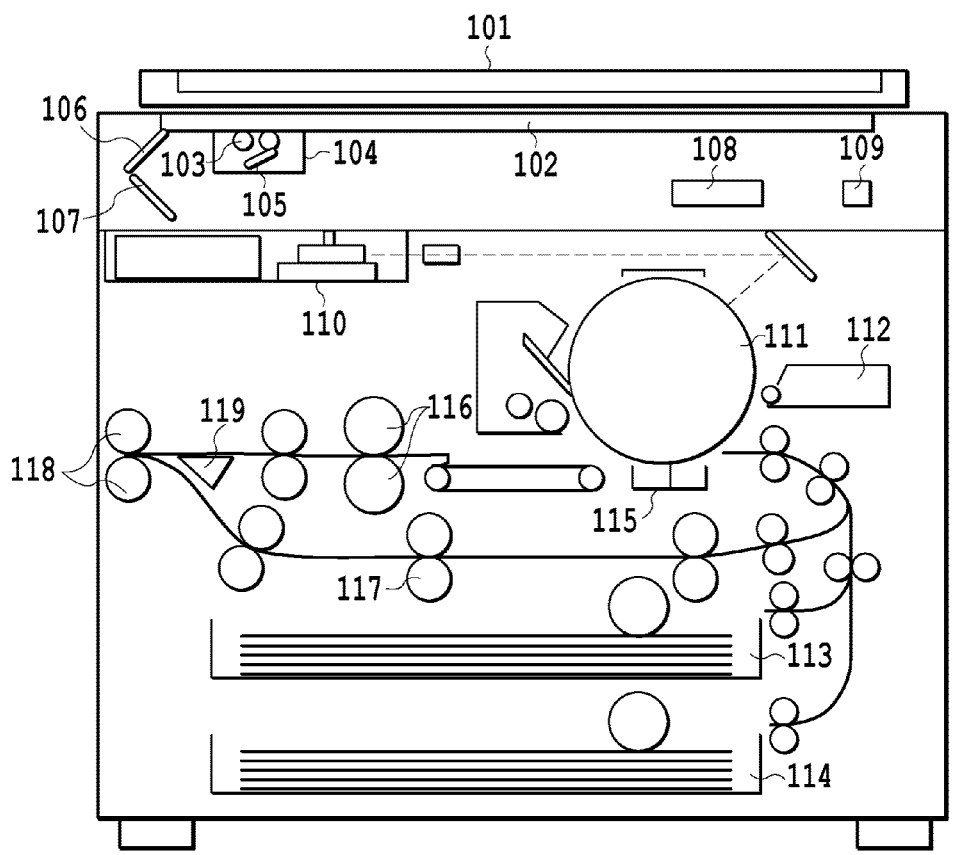
FIG. 1 is a section view of a copy machine.
Figure 2:
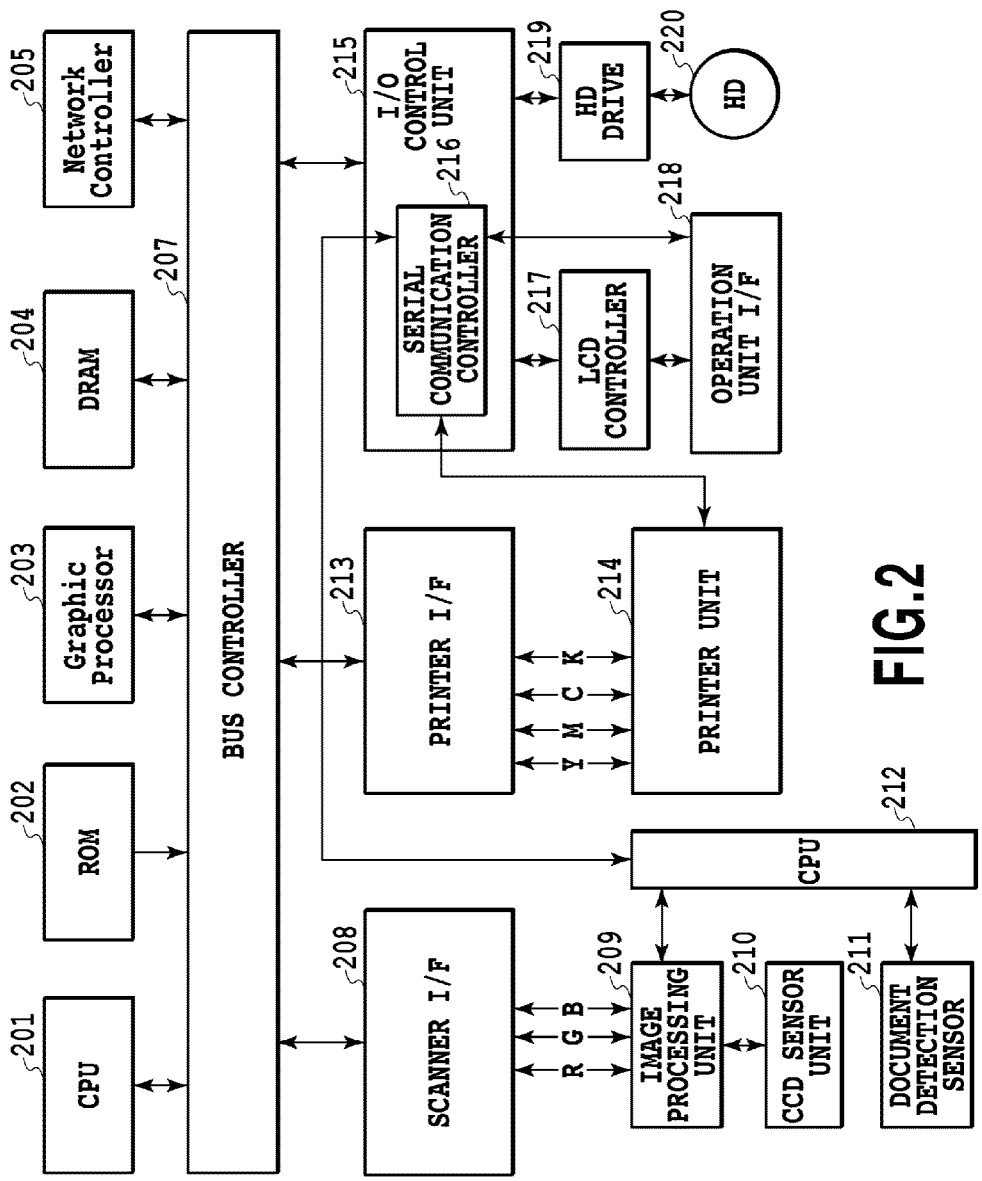
FIG. 2 is a function block diagram of the copy machine.

FIG. 1 is a section view of a copy machine as an image forming apparatus in the present embodiment. FIG. 2 is a function block diagram of the copy machine as the image forming apparatus in the present embodiment. In the present embodiment, the main control is performed by a CPU 201. The CPU 201 controls each block and module of FIGS. 1 and 2 in accordance with a control program stored in a ROM 202 or a control program loaded from an HD 220 to a DRAM 204 by an initial program stored in the ROM 202.

Hereinafter, using FIGS. 1 and 2, the image read operation and the image printing operation in the copy machine according to the present embodiment are explained. When reading a document, first, the document is placed on a contact glass 102. The document placed on the contact glass 102 is exposed by lighting of a lamp 103 and scanned by the movement of an optical unit 104. Reflected light from the document at this time is guided to a CCD image sensor (hereinafter, referred to as CCD) 109 by mirrors 105 to 107 and a lens 108. Due to this, the image of the document is read by the CCD 109.

The document read operation is explained as follows with reference to FIG. 2. When a CCD sensor unit 210 reads the image by scanning the document in response to the instruction from a CPU 212 of a scanner, data of the read image is converted into image data of an RGB signal in an image processing unit 209 by the instruction from the CPU 212. The converted image data of the RGB signal is temporarily stored in the DRAM 204 via a scanner I/F 208 and a bus controller 207 and then, is saved in the HD 220 via an I/O control unit 215 and an HD drive 219.

When image data saved in the HD 220 is printed, the image data is temporarily saved in the DRAM 204 by the instruction of the CPU 201. After that, color space conversion, such as RGB→CMYK conversion, is performed via a graphic processor 203. The image data thus converted is sent to a printer unit 214 via a printer I/F 213. The image data sent to the printer unit 214 is converted in a laser unit 110 from image data into data indicative of the laser intensity when an electrostatic latent image is generated by laser light. On the basis of converted data indicative of the laser intensity, an image is formed on a photosensitive drum 111 by the laser light emitted from the laser unit 110 and an electrostatic latent image is generated. In a development unit 112, toner is adsorbed by the charges of the electrostatic latent image to develop the image and thus a toner image is formed. The generated toner image is transferred onto a sheet fed from sheet feed cassettes 113/114 and fixed in a fixing unit 115, and then the sheet on which the toner image is fixed is transferred by a transfer roller 118 and ejected to outside of the machine.

In order to perform gradation correction more accurately, it is desirable to perform printing in a state in which variation in density due to the variation in the fixing temperature is suppressed.

Therefore, to stabilize the fixing temperature (stabilization of fixing process) at the time of printing of the gradation measurement chart, a plurality of sheets is subjected to the printing process (sheets are passed) before printing of the gradation measurement chart in the present embodiment.

Figure 4:
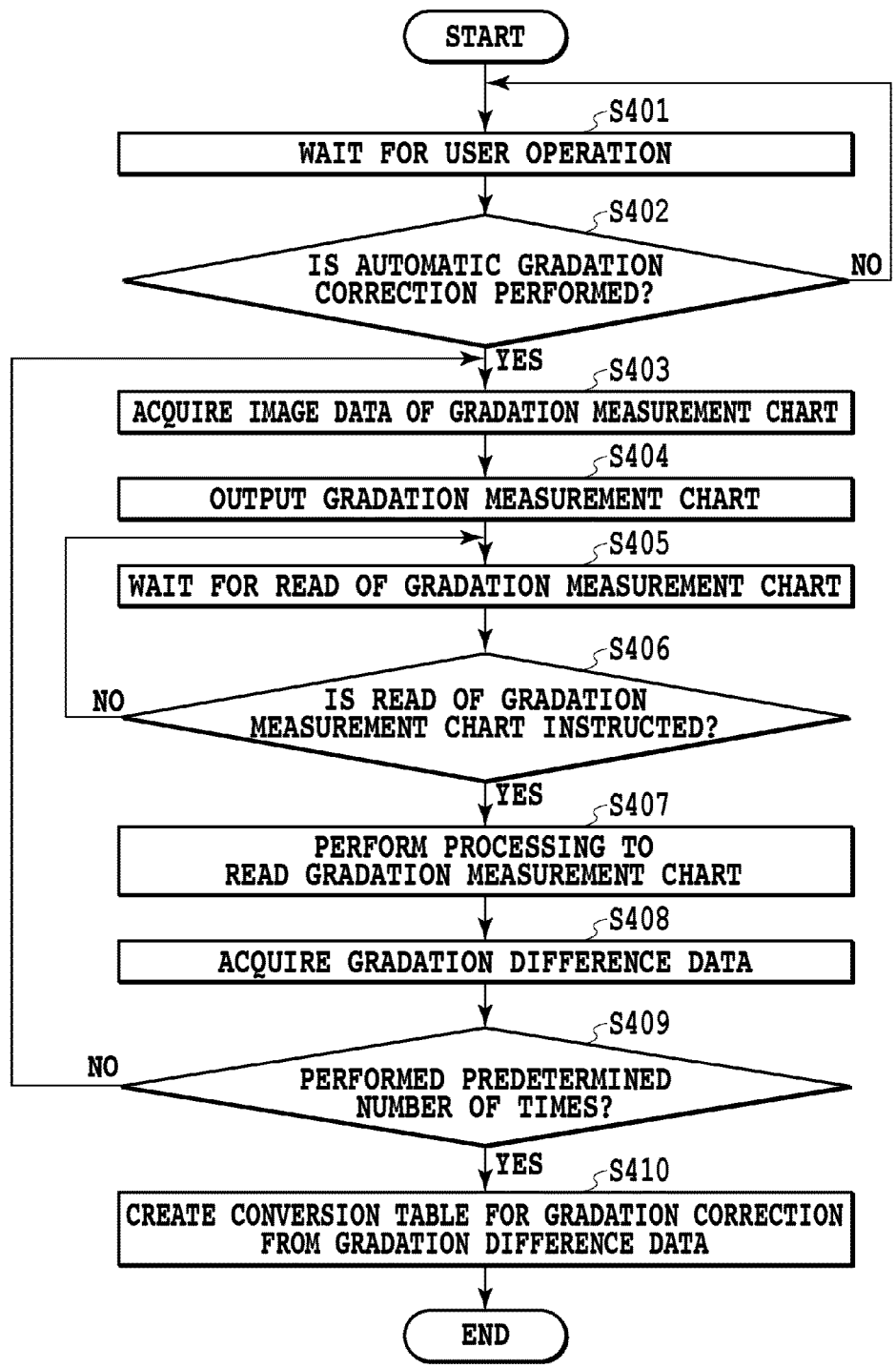
FIG. 4 is a flowchart showing a flow of creation of a conventional gradation correction conversion table.
Figure 5:
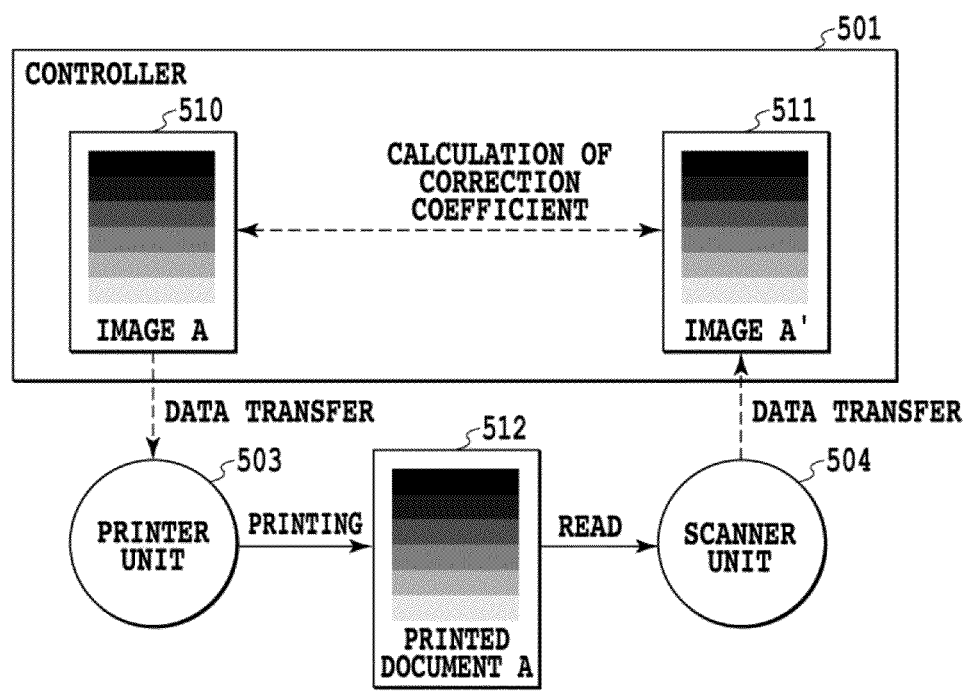
FIG. 5 is a conceptual diagram of conventional automatic gradation correction.
Figure 6:
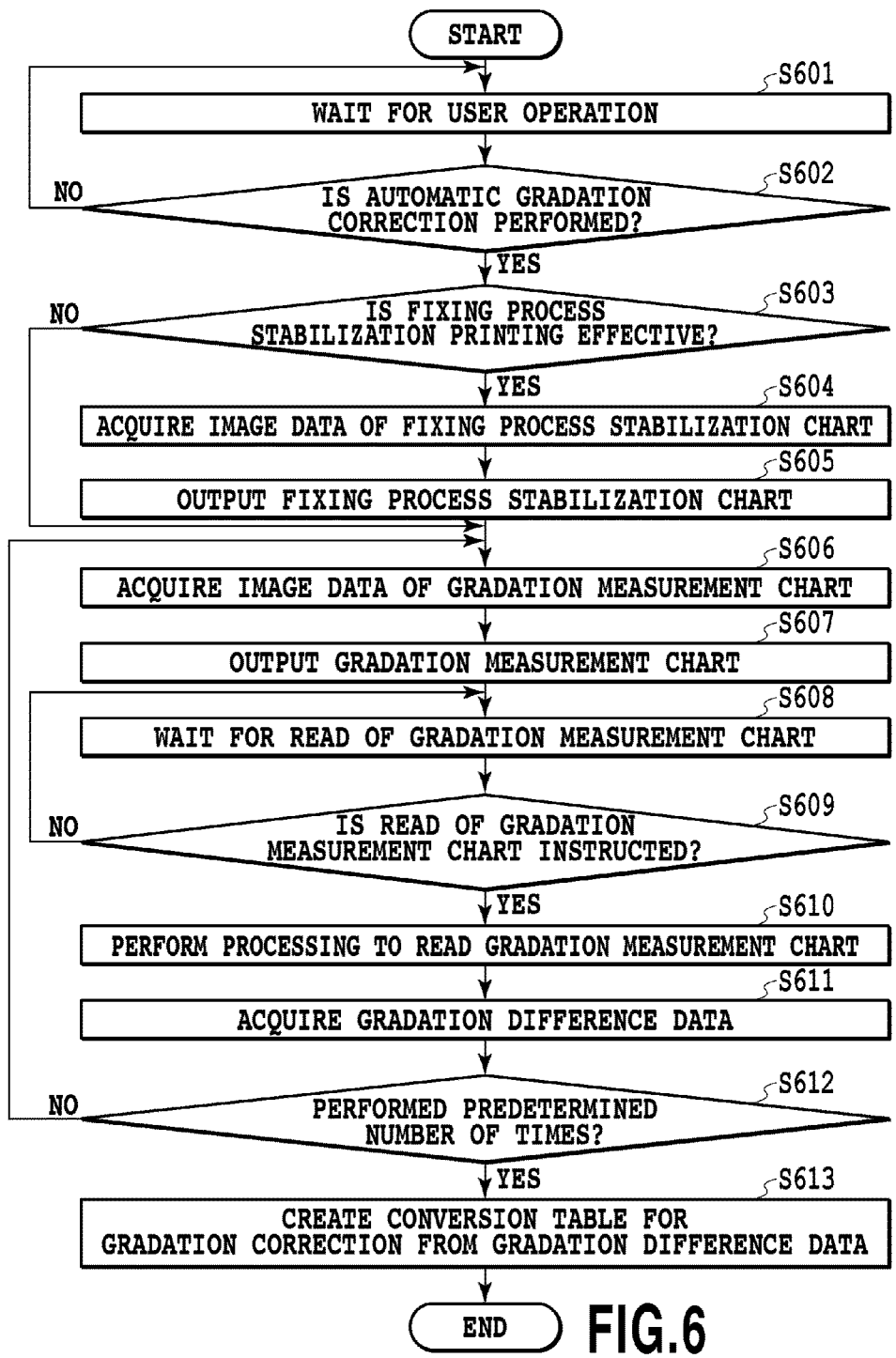
FIG. 6 is a flowchart showing a flow of creation of a gradation correction conversion table including stabilization processing of fixing process.
Figure 7:
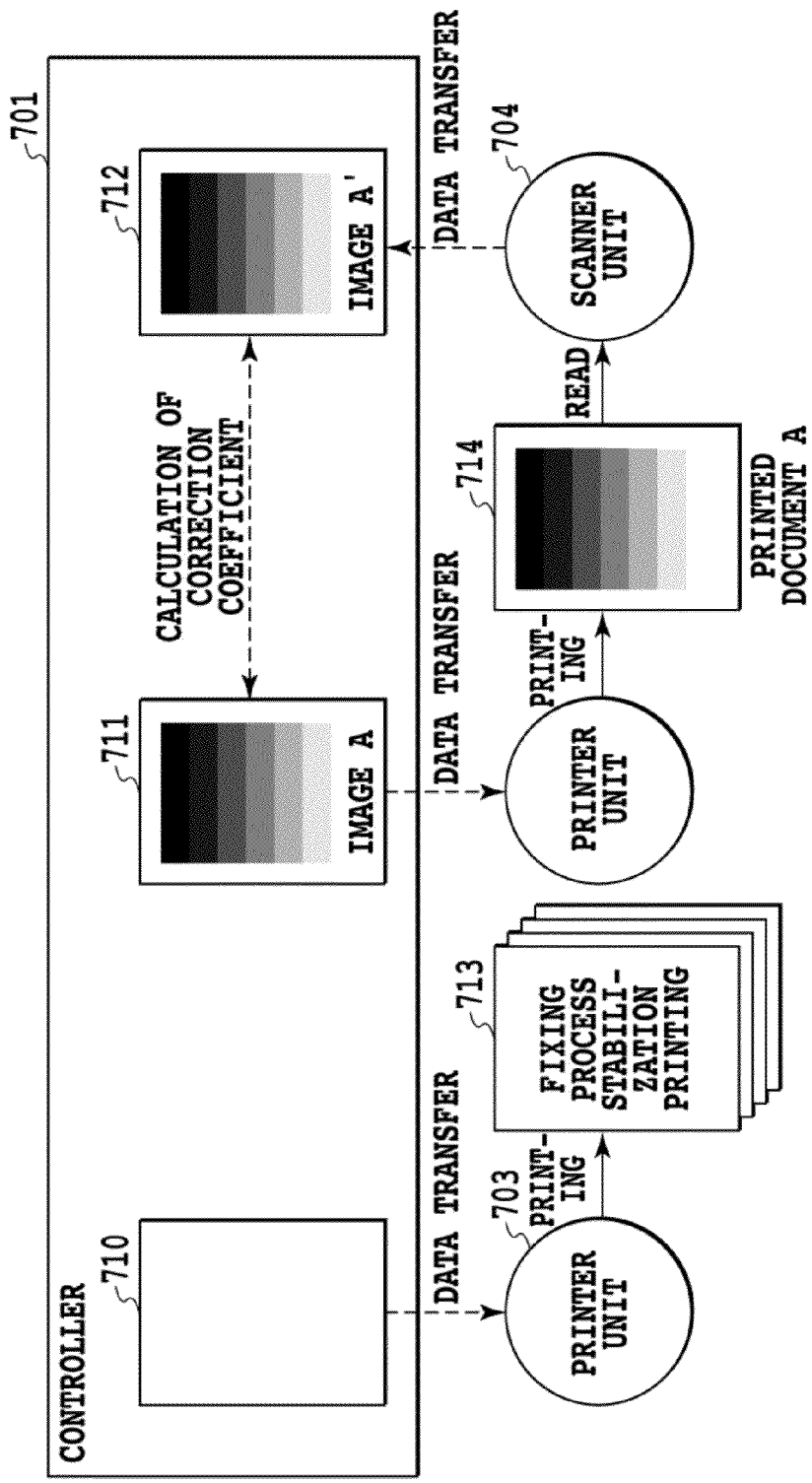
FIG. 7 is a conceptual diagram of automatic gradation correction including the stabilization processing of fixing process.

FIG. 6 is a flowchart showing a flow of creation of the gradation correction conversion table for automatic gradation correction including the stabilization processing of fixing process. Compared to the flowchart shown in FIG. 4, steps 603 to 605 are added as processing to stabilize the fixing process.

In the present embodiment, the contents of fixing process stabilization processing (hereinafter, simply referred to as "stabilization processing"), for example, the number of sheets to use, are determined in advance in accordance with the kind of sheet and optimum stabilization processing in accordance with the sheet to use (to be used) is performed. To this end, information such as the characteristic of each sheet that can be used in the printer unit (hereinafter, referred to as "sheet characteristic information") is stored in advance in the HD 220 etc. FIG. 14 is a table showing an example of the sheet characteristic information that is saved in the HD 220 etc. This table includes each piece of information of "Sheet type ID" to identify each sheet uniquely, "Name" indicating the purpose when in use, "Basis weight" indicating the weight of the sheet, "Surface property" indicating the kind of sheet, such as high quality paper, recycled paper, and coated paper, and "Form" of the sheet, such as the standard and the letter-size sheet. Further, in the present embodiment, according to the sheet type, adjustment of the photosensitive drum 111, the development unit 112, the fixing unit 115, and a transfer roller 116 and the transfer roller 118 is performed and "Adjustment value" for this adjustment is also included. Furthermore, "Fixing process stabilization PG number" and "Number of printed output sheets for fixing process stabilization", which are information referred to in the stabilization processing, are also included. Fixing process stabilization PG number and Number of printed output sheets for fixing process stabilization are described later.

The fixing temperature of the fixing unit 115 is adjusted by a heater (not shown schematically). However, it takes time to heat the fixing unit 115 to an optimum fixing temperature and there is a case where the temperature variation becomes temporarily large. In order to suppress the temperature variation, a sheet is passed through the fixing unit 115 to absorb heat of the fixing unit 115 therein, which makes it easy to adjust the temperature of the fixing unit 115 to a target temperature. This is an outline of the fixing process stabilization processing.

The fixing process stabilization PG is image data used in printing accompanying stabilization processing (printing of the fixing process stabilization chart). The fixing process stabilization PG is stored in advance in the HD 220 etc. after the number to identify the individual fixing process stabilization PG is allocated. In this case, the image data of the fixing process stabilization PG is not necessarily the same as the image data used at the time of printing of the gradation measurement chart and may be image data that can be formed with a less amount of toner. When the image data of the fixing process stabilization PG is made different from the image data used at the time of printing of the gradation measurement chart, it is only required to give an identifier to each piece of image data for discrimination. In the column of "Fixing process stabilization PG number" in the table of FIG. 14, numbers allocated to identify the image data used in printing of the fixing process stabilization chart are stored in association with Sheet type ID. In the table of FIG. 14, the setting contents in the column of Fixing process stabilization PG number corresponding to "1" and "2" of Sheet type ID is "0". This means no image data and in this case, a sheet is passed through the fixing unit 115 without forming an image on the sheet and as a result, stabilization processing in which a white (blank) sheet is output is performed. "Number of printed output sheets for fixing process stabilization" in the table of FIG. 14 is information indicative of the number of sheets output in the stabilization processing. This Number of printed output sheets for fixing process stabilization is determined in accordance with the sheet type. For example, in the case of a thick paper or a glossy paper, the basis weight of which is greater than that of a plain paper, the fixing speed is slow and it takes time to pass the sheet through the fixing unit 115, and therefore, the amount of heat that one sheet can absorb is increased. Due to this, the number of sheets necessary for the stabilization processing may be smaller. As described above, the greater the basis weight, the smaller the number of sheets that may be necessary for the stabilization processing.

Figure 3:
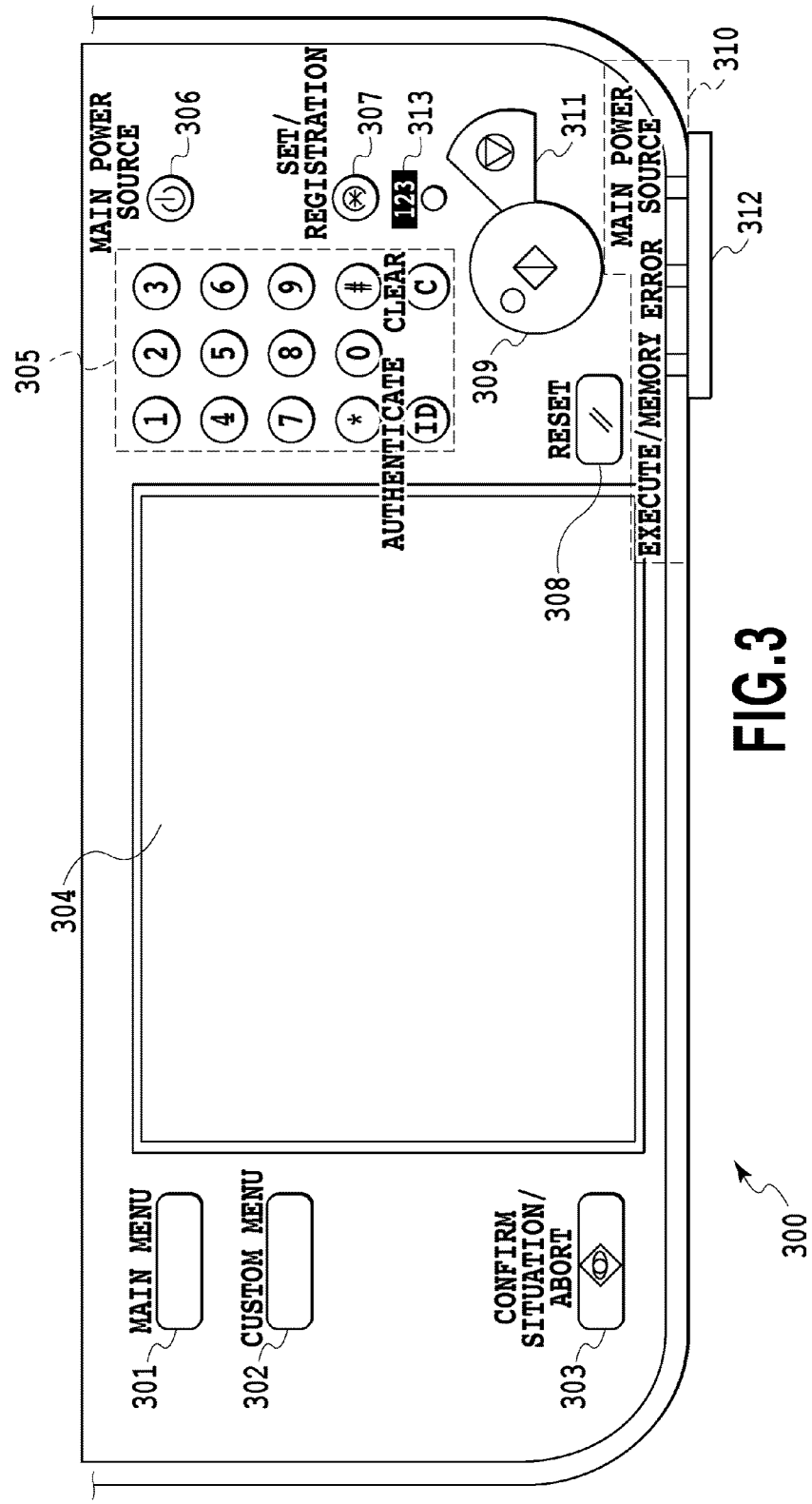
FIG. 3 is a diagram showing an example of an operation unit.
Figure 15:
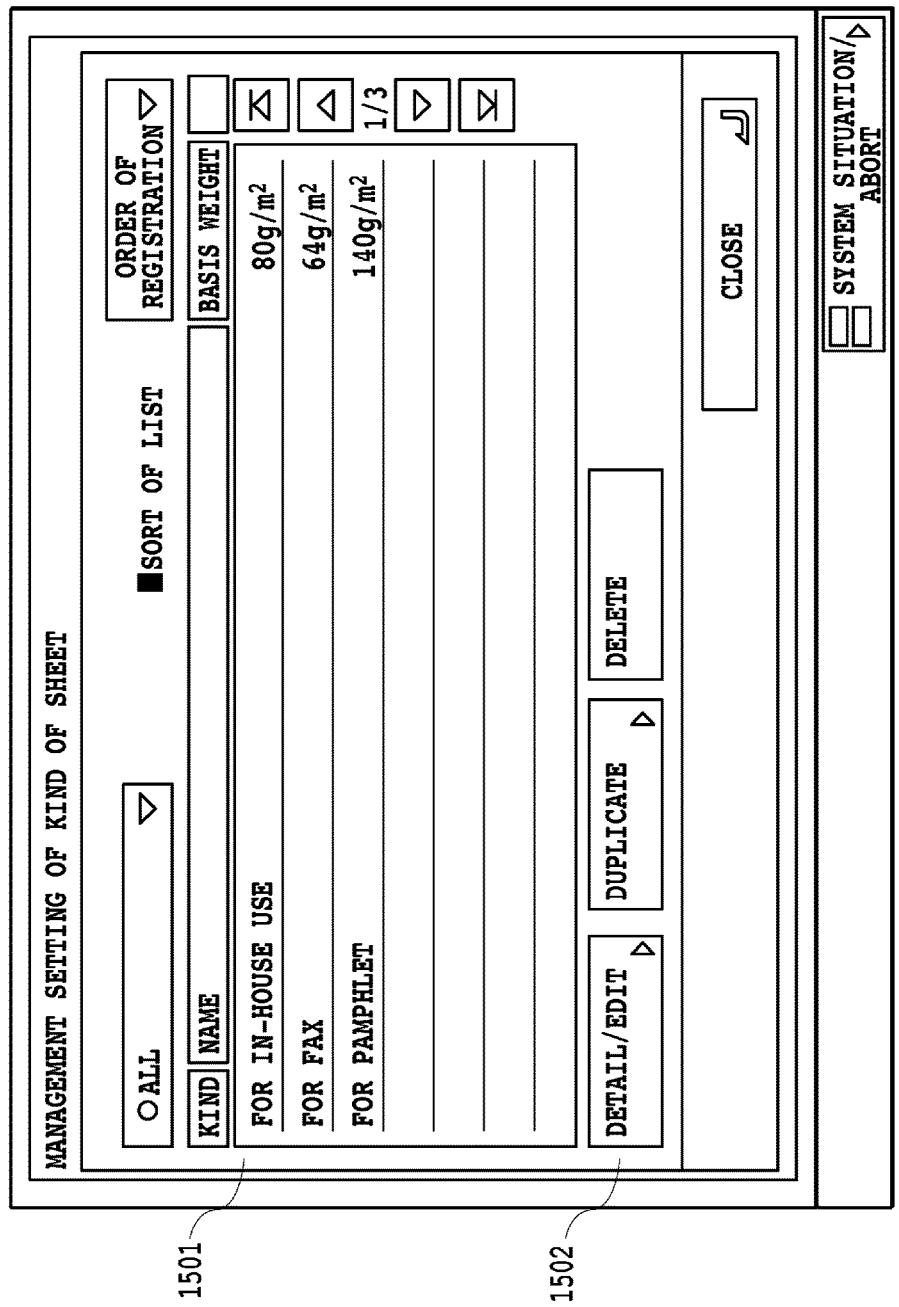
FIG. 15 is an example of a UI screen for setting and changing the setting contents of the sheet characteristic information.
Figure 16:
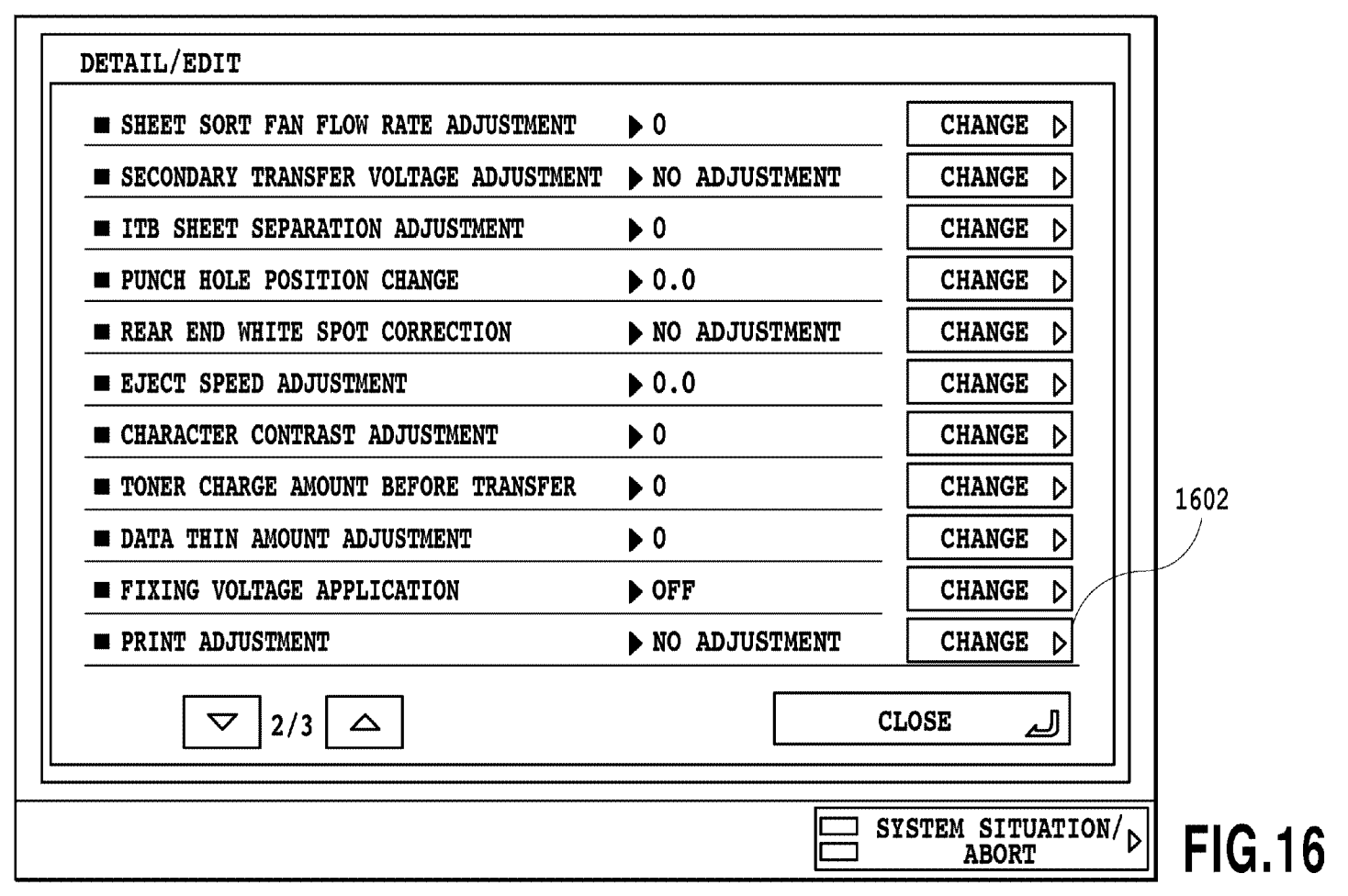

It is possible for a user to set and change the setting contents of the above-described sheet characteristic information via an operation unit 300 of the copy machine as shown in FIG. 3. Specifically, when a user presses down Set/registration key 307, the CPU 201 recognizes the pressing down via an operation unit I/F 218 and the I/O control unit 215. Then, it is possible to make a change from a user interface screen (UI screen) displayed on an LCD panel 304, which is a display unit, via an LCD controller 217 and the operation unit I/F 218. FIG. 15 is an example of the UI screen for setting and changing the setting contents of the sheet characteristic information and for example, by pressing down "Detail/edit" button 1502 on this screen, a UI screen is further displayed, on which the contents of each set value of the sheet characteristic information can be confirmed and changed. FIG. 16 is an example of a UI screen to confirm the details of each set value of the sheet characteristic information and to change the contents and by operating a "Change" button 1602 located on the right side of the items on the screen, it is made possible to change each value. The changed value is notified to the CPU 201 via the operation unit I/F 218 and the I/O control unit 215 and the CPU 201 reflects the notified value in the sheet characteristic information (for example, the table of FIG. 14) stored within the HD 220 etc.

FIG. 13 is a table showing an example of information of various sheets (stored sheet information) to be stored in the sheet feed cassettes 113/114 etc. of the printer unit 214. In this table of the stored sheet information, for each sheet feed cassette to which a unique number of 1 to 4 is allocated, each of the size of the sheet to be stored, the size in the main scan direction, the size in the sub scan direction, and Sheet type ID is set. The kind of sheet is designated by Sheet type ID, but, this is not limited and any specification may be used as long as the sheet can be designated. Further, in the present embodiment, the four attributes are set for each sheet, but, the number of attributes is not limited to this and it may be also possible to further add another attribute or to reduce the number of attributes. Furthermore, in the present embodiment, it is assumed that the stored sheet information is set by a user, but, it may also be possible to perform setting by obtaining information from an external PC etc. or by automatically determining within the printer. Such stored sheet information is stored in the DRAM 204 etc.

The stored sheet information will now be explained in more detail. In the case of the table of FIG. 13, for example, in the sheet feed cassette 1, the sheet of A4 size and given "1" as Sheet type ID is stored. Then, as each of the setting contents of the four attributes of "Sheet size", "Main scan size", "Sub scan size", and "Sheet type ID", "A4", "297.0", "210.0", and "1" are set, respectively. In this case, usually, Main scan size and Sub scan size are determined uniquely when the sheet size is a typical one, and therefore, it is possible to omit them from the stored sheet information (so Main scan size and Sub scan size may not be stored for a typical or common sheet size).

When performing stabilization processing, first, the CPU 201 reads the information of Sheet type ID of each sheet feed cassette by referring to the table of FIG. 13. Then, the information of "Basis weight", "Surface property", "Form", and "Adjustment value" of the sheet with which the read Sheet type ID agrees is acquired by referring to the table of FIG. 14 and is sent to the printer unit 214 via the printer I/F 213. The printer unit 214 controls the photosensitive drum 111, the development unit 112, the fixing unit 115, and the transfer rollers 116 and 118 based on the information of Basis weight, Surface property, Form, and Adjustment value sent from the CPU 201 and performs the stabilization processing of fixing process.

In the present embodiment, the condition when performing the processing of automatic gradation correction is set in advance and under the set condition (hereinafter, referred to as "setting of automatic gradation correction operation"), automatic gradation correction processing is performed. The setting of automatic gradation correction operation is performed as follows.

Figure 17:
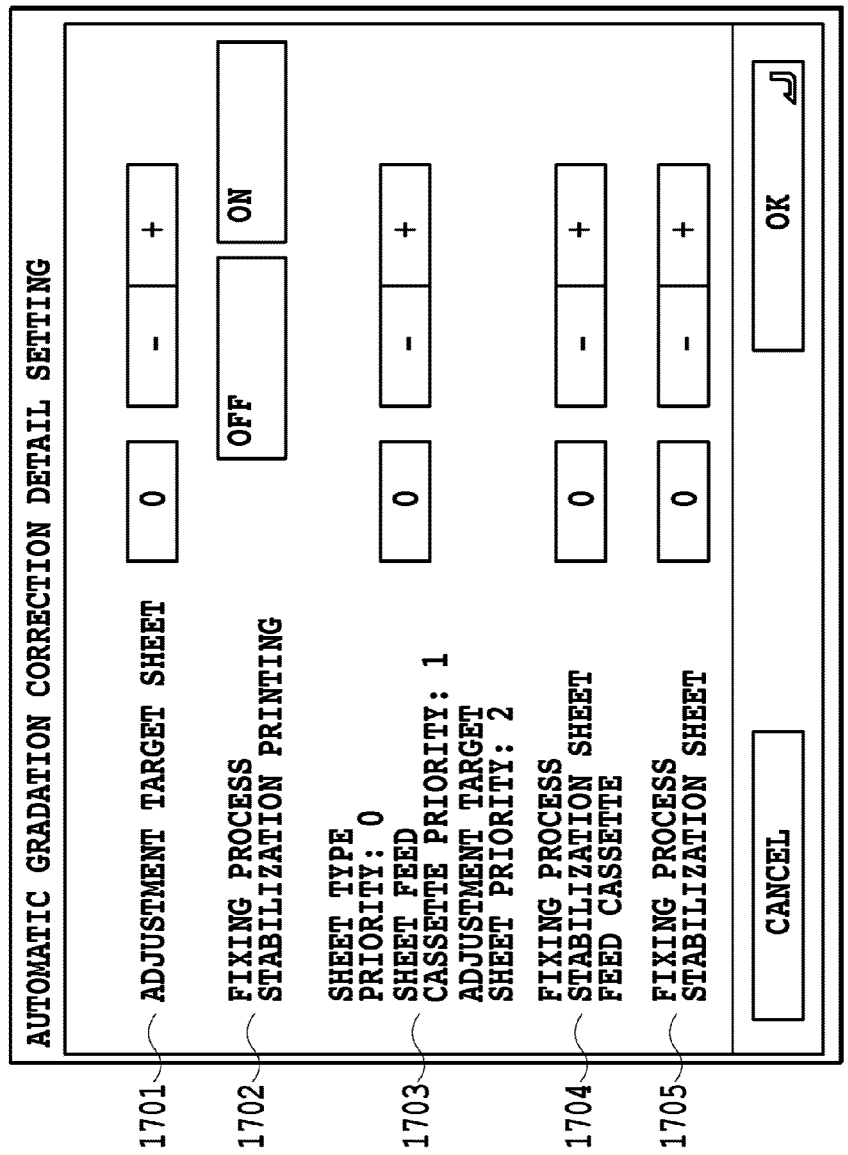
FIG. 17 is a diagram showing an example of an automatic gradation correction detail setting screen.

First, when the Set/registration key 307 provided on the operation unit 300 is pressed down by a user, the CPU 201 displays an automatic gradation correction detail setting screen on the LCD panel 304 via the LCD controller 217 and the operation unit I/F 218. FIG. 17 is a diagram showing an example of the automatic gradation correction detail setting screen in which five setting items exist.

Reference numeral 1701 is a setting item to specify a sheet used in printing of the gradation measurement chart (Adjustment target sheet) by designating the kind of sheet and Sheet type ID of the sheet to use (to be used) is input.

Reference numeral 1702 is a setting item to specify whether or not to perform the stabilization processing of fixing process and is set to "ON" when performing the stabilization processing and to "OFF" when not performing the stabilization processing.

Reference numeral 1703 is a setting item to specify a reference when determining the sheet used in the stabilization processing (sheet used in printing of the fixing process stabilization chart). When the kind of sheet is specified as a reference, the setting item is set to "0" indicating "Sheet type priority". When the sheet feed cassette is specified as a reference, the item is set to "1" indicating "Sheet feed cassette priority". When the use of the same sheet as the sheet used in printing of the gradation measurement chart is specified as a reference, the item is set to "2" indicating "Adjustment target sheet priority". As described above, the kind of sheet used in printing of the fixing process stabilization chart may be the same as the print sheet of the gradation measurement chart or may be a specific kind of paper (for example, an inexpensive paper, such as the recycled paper) set in advance for printing of the fixing process stabilization chart.

Reference numeral 1704 is a setting item to specify the sheet used in the stabilization processing by the sheet feed cassette. The setting is made by the identifier (for example, the number of 1 to 4 attached to each Sheet feed cassette in the table of FIG. 13) to designate the sheet feed cassette.

Reference numeral 1705 is a setting item to specify the sheet used in the stabilization processing by designating the kind of sheet and Sheet type ID of the sheet to use is input.

The value etc. set for each of the above-described items is notified to the CPU 201 via the operation unit I/F 218 and the I/O control unit 215 and the CPU 201 stores the notified value etc. in the DRAM 204 etc. as a set value in each item.

FIG. 12 is a table showing an example of the setting of automatic gradation correction operation. In the table of FIG. 12, each set value is input in each item of "Adjustment target sheet", "Fixing process stabilization printing", "Fixing process stabilization print sheet", "Fixing process stabilization sheet feed cassette", and "Fixing process stabilization sheet".

First, in "Adjustment target sheet", "3" is set as the value of Sheet type ID to designate the kind of sheet used in the printing processing of the gradation measurement chart.

Then, in "Fixing process stabilization printing", "ON" indicating the execution of the stabilization processing is set.

Then, in "Fixing process stabilization print sheet", "0" indicating that determination is made with a reference of the sheet type when determining the sheet used in the stabilization processing is set.

Then, in "Fixing process stabilization sheet feed cassette", "3" is set as a value to designate Sheet feed cassette when the sheet feed cassette is taken as a reference when determining the sheet used in the stabilization processing.

Then, in "Fixing process stabilization sheet", "1" is set as a value of Sheet type ID to designate the kind of sheet when the kind of sheet is taken as a reference when determining the sheet used in the stabilization processing.

Figure 8:
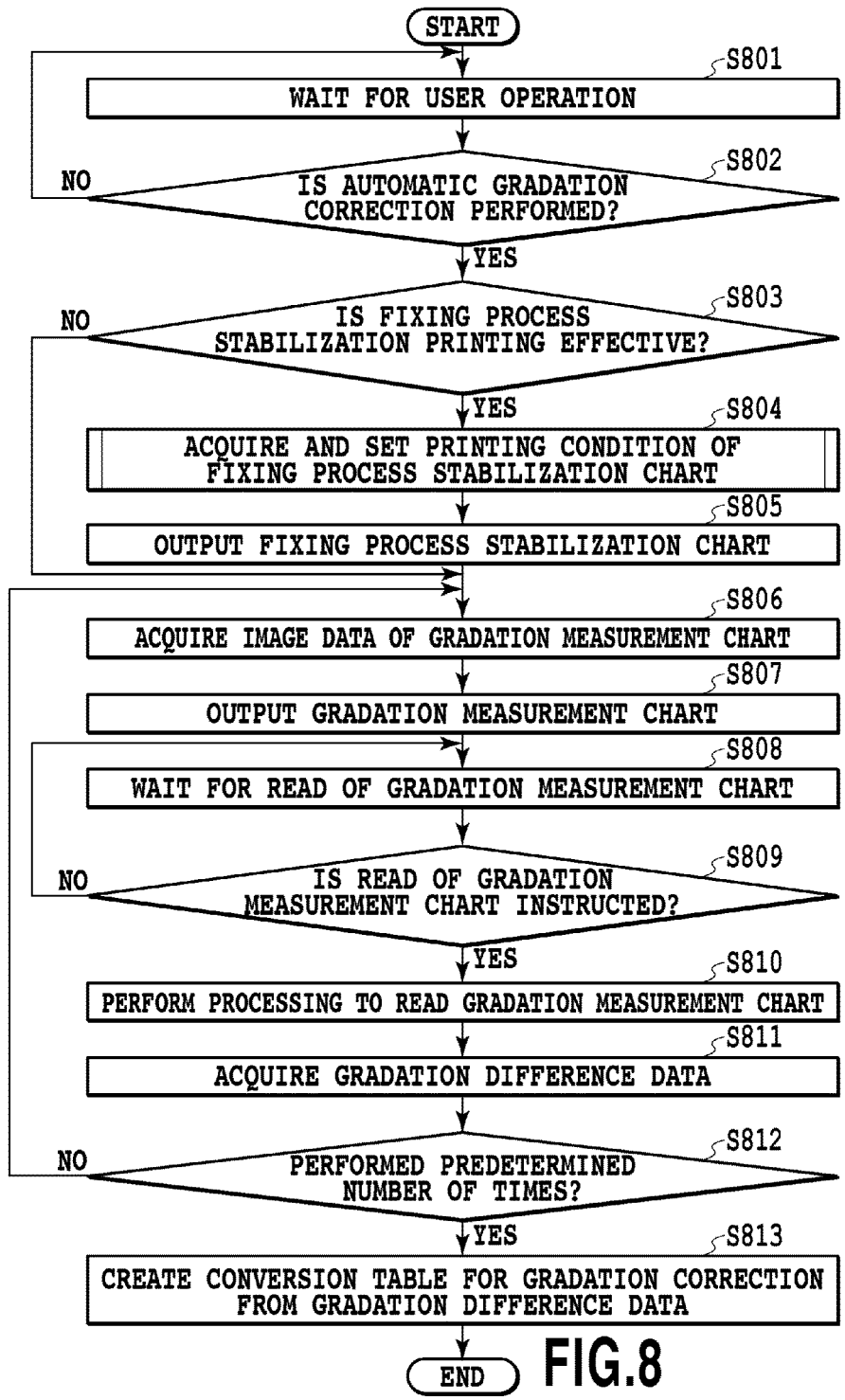
FIG. 8 is a flowchart showing a flow of creation of a gradation correction conversion table including stabilization processing according to the present embodiment.

FIG. 8 is a flowchart showing a flow of creation of a gradation correction conversion table including stabilization processing according to the present embodiment.

Step 801 is the state of waiting for an operation instruction (instruction to create a gradation correction conversion table) to perform automatic gradation correction from a user. When a user instructs to perform automatic gradation correction (Yes at step 802), the CPU 201 refers to the setting contents of "Fixing process stabilization printing" in the setting of automatic gradation correction operation described previously and determines whether to perform the stabilization processing (step 803). When the setting contents of Fixing process stabilization printing is "ON", the procedure proceeds to step 804. On the other hand, when the setting contents of Fixing process stabilization printing is "OFF", the procedure proceeds to step 806.

At step 804, the CPU 201 acquires and sets the printing condition of the fixing process stabilization chart by referring to the setting of automatic gradation correction operation (FIG. 12) and the setting contents of the stored sheet information (FIG. 13) and the sheet characteristic information (FIG. 14). Details of the acquisition and setting processing of the printing condition of the fixing process stabilization chart will be described later.

At step 805, the CPU 201 outputs the fixing process stabilization chart in accordance with the printing condition set at step 804. That is, the CPU 201 acquires the fixing process stabilization PG, which is image data for the fixing process stabilization chart, in accordance with the set printing condition and sends the acquired image data to the printer unit 214 for printing. However, as will be described later, there is a case where image data for the fixing process stabilization chart is not acquired. In this case, no image is formed on the sheet (the sheet is passed through only the fixing unit 115) and a white (blank) sheet is output as a result.

It may also be possible to display how many sheets of the fixing process stabilization chart are output (or how many sheets are to be output from now, so how many sheets are still to be output) on the LCD panel 304 of the operation unit 300 at any time while the fixing process stabilization chart is being output. Further, it may also be possible to display whether the chart currently being output is the fixing process stabilization chart or the gradation measurement chart. Due to this, it is made easier for a user to discriminate the chart currently being output between the fixing process stabilization chart and the gradation measurement chart.

Furthermore, in the printing of the gradation measurement chart, when the same image data as that in the case of the fixing process stabilization chart is used, it may also be possible to produce a display to prompt a user to use the finally output fixing process stabilization chart as the gradation measurement chart. In this case, the "same image" includes the case where images can be evaluated to be substantially the same as well as the case where the images are quite (exactly) the same. When the finally output fixing process stabilization chart is used as the gradation measurement chart as it is, the processing of steps 806 and 807 to be described later is omitted as a result.

Next, the CPU 201 acquires image data to use in the printing of the gradation measurement chart from the HD 220 etc. (step 806). The acquired image data is stored in the DRAM 204 and at the same time, is sent to the printer unit 214 and output in the printer unit 214 (step 807).

After the printing of the gradation measurement chart is completed, the CPU 201 enters the state of waiting for an instruction to read the gradation measurement chart from a user (step 808). The output gradation measurement chart is set on the contact glass 102 and when a user instructs to read the gradation measurement chart (Yes at step 809), the CPU 201 instructs the CPU 212 of the scanner to read the gradation measurement chart. In response to this, the CPU 212 of the scanner lights the lamp 103, scans the gradation measurement chart on the contact glass 102 by moving the optical unit 104, and reads the set gradation measurement chart by the CCD 109 (step 810). The image data of the read gradation measurement chart is sent to the DRAM 204 via the image processing unit 209, the scanner I/F 208, and the bus controller 207.

At step 811, the CPU 201 compares the image data obtained by reading the gradation measurement chart and the image data (or target data stored in the memory) of the gradation measurement chart acquired at step 806 and finds a difference between both (gradation difference data). The obtained gradation difference data is saved in the DRAM 204.

At step 812, the CPU 201 determines whether each of step 806 to step 811 is (has been) performed a predetermined number of times. If the predetermined number of times is not reached, the procedure returns to step 806. When determining that each step is (has been) performed the predetermined number of times, the CPU 201 creates the conversion table for gradation correction from the gradation difference data saved in the DRAM 204 (step 813). The created gradation correction conversion table is saved in the DRAM 204 and sent to the graphic processor 203 by the CPU 201 at the time of printing and used for gradation correction at the time of printing.

Figure 9:
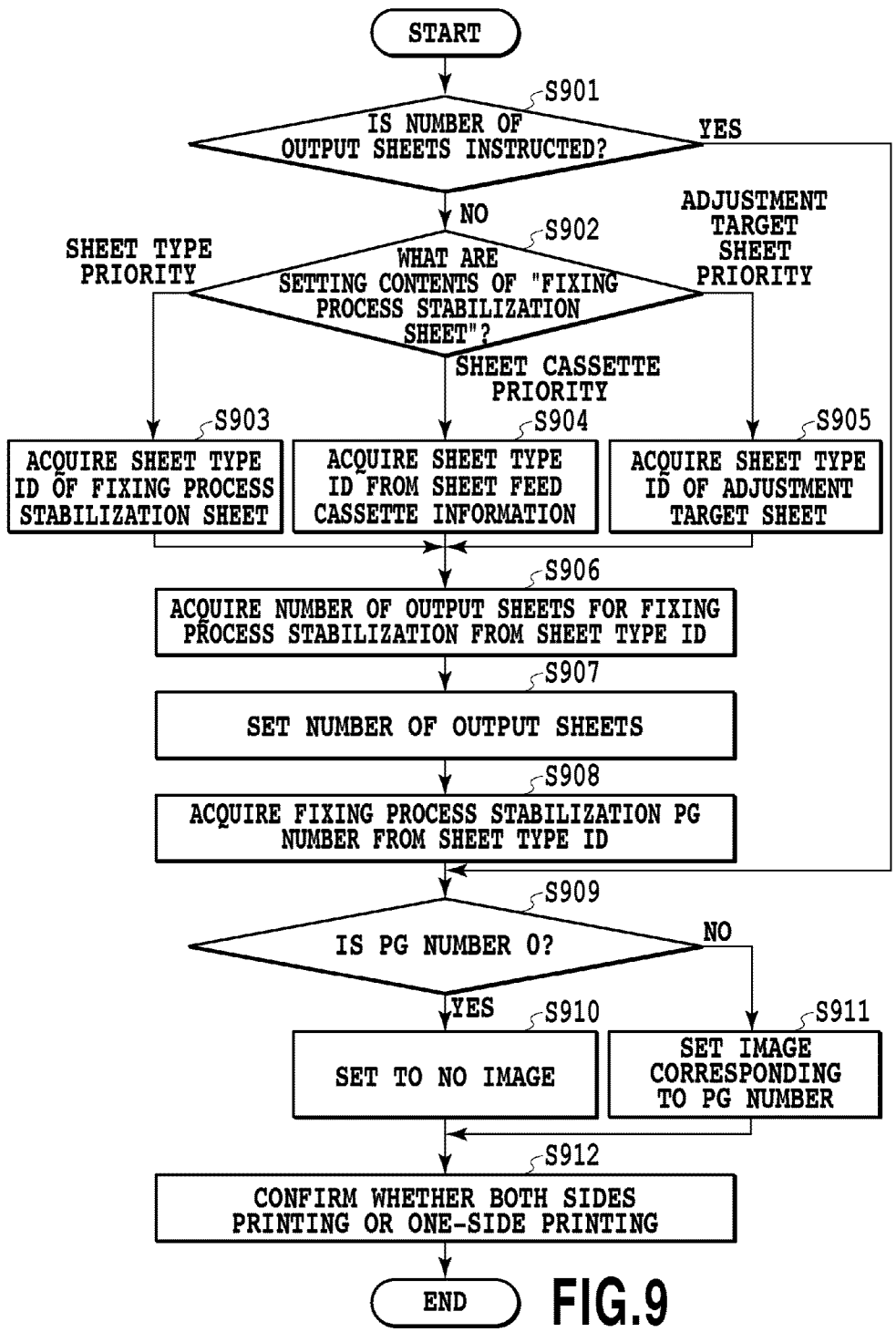
FIG. 9 is a flowchart showing a flow of processing to acquire and set a printing condition of a fixing process stabilization chart.

Acquisition and Setting Processing of Printing Condition of Fixing Process Stabilization Chart FIG. 9 is a flowchart showing a flow of processing to acquire and set the printing condition of the fixing process stabilization chart at step 804 described above.

Figure 18:
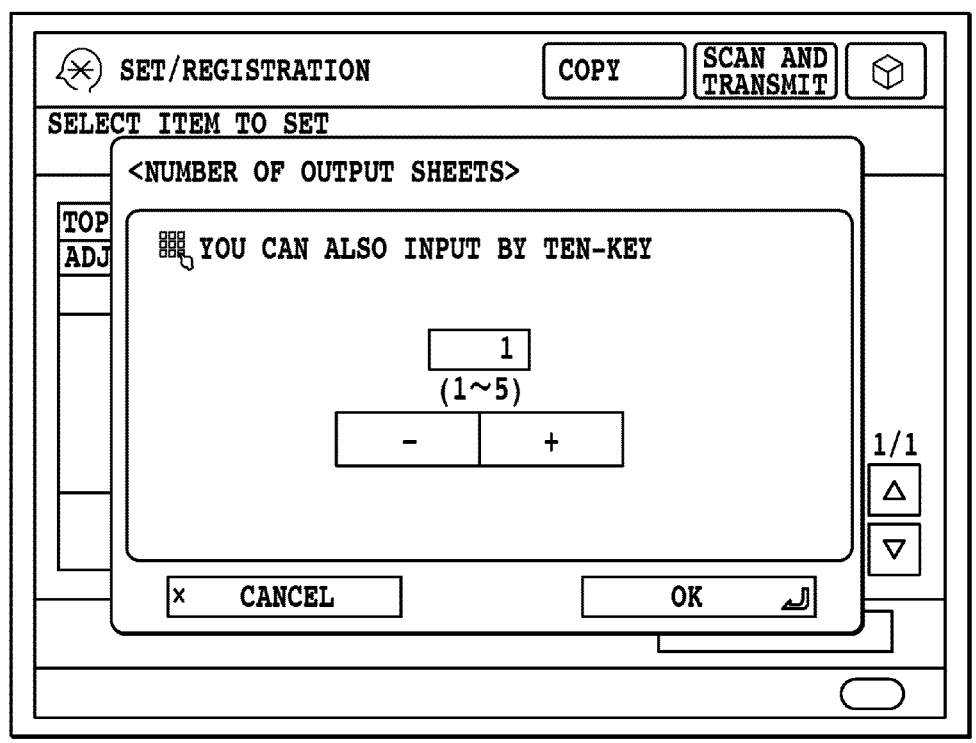
FIG. 18 is an example of a UI screen when specifying the number of output sheets of the fixing process stabilization chart.

As step 901, the CPU 201 determines whether the number of output sheets of the fixing process stabilization chart is (has been) specified in advance (before instructed to perform automatic gradation correction). FIG. 18 is an example of the UI screen when specifying the number of output sheets of the fixing process stabilization chart. The UI screen shown in FIG. 18 is intended so that the number of output sheets of the process stabilization chart can be set in the range of one to five. By setting the upper limit value (five in this example) in advance, it is possible to prevent the number of output sheets more than necessary from being instructed (so prevents an unnecessarily large number of output sheets being instructed). When it is determined that the number of output sheets of the fixing process stabilization chart is (has been) specified in advance, the procedure proceeds to step 909. On the other hand, when it is determined that the number of output sheets is not specified in advance, the procedure proceeds to step 902.

At step 902, the CPU 201 refers to the setting contents of "Fixing process stabilization print sheet" in the setting of automatic gradation correction operation and determines by which reference the sheet used in the stabilization processing is determined. When it is determined that Priority is given to sheet type is set (when "0" indicating Sheet type priority is set), the procedure proceeds to step 903. When it is determined that Priority is given to sheet feed cassette is set (when "1" indicating Sheet feed cassette priority is set), the procedure proceeds to step 904. When it is determined that Priority is given to adjustment target sheet is set (when "2" indicating Adjustment target sheet priority is set), the procedure proceeds to step 905.

At step 903, the CPU 201 refers to the setting contents of "Fixing process stabilization sheet" in the setting of automatic gradation correction operation and acquires Sheet type ID that is set.

At step 904, the CPU 201 reads the setting contents (value of 1 to 4) of "Fixing process stabilization sheet feed cassette" in the setting of automatic gradation correction operation. Then, the CPU 201 acquires Sheet type ID of the sheet stored in the sheet feed cassette indicated by the read setting contents ("3" in the example of FIG. 12) by referring to the above-described stored sheet information (FIG. 13).

At step 905, the CPU 201 refers to the setting contents of "Adjustment target sheet" in the setting of automatic gradation correction operation and acquires Sheet type ID that is set.

At step 906, the CPU 201 acquires the setting contents of "Number of printed output sheets for fixing process stabilization" corresponding to Sheet type ID in question by referring to the above-described sheet characteristic information (FIG. 14) based on Sheet type ID acquired at steps 903 to 905.

At step 907, the CPU 201 specifies the acquired number of output sheets as the number of output sheets in the printing of the fixing process stabilization chart.

At step 908, the CPU 201 acquires the setting contents of "Fixing process stabilization PG number" corresponding to Sheet type ID in question by referring to the above-described sheet characteristic information (FIG. 14) based on Sheet type ID acquired at steps 903 to 905.

At step 909, the CPU 201 determines whether the value of acquired Fixing process stabilization PG number is "0". When the value is "0", the procedure proceeds to step 910. On the other hand, when the value is other than "0", the procedure proceeds to step 911.

At step 910, the CPU 201 sets no use of image data as the fixing process stabilization chart, that is, "no image".

At step 911, the CPU 201 reads the image data corresponding to the acquired process stabilization PG number from the HD 220 etc. and sets the read image data as the image of the fixing process stabilization chart.

At step 912, the CPU 201 determines whether the setting of printing of both sides of the sheet (double-sided printing setting) is set in the output setting of the printer unit 214. When it is determined that the double-sided printing is set, to the printer unit 214, the image data set as the image of the fixing process stabilization chart (or information indicative of no image) is sent with the specification of double-sided printing. Due to this, the fixing process stabilization chart is output in the number of output sheets set in the double-sided printing. On the other hand, when it is determined that double-sided printing setting is not made (setting to print on one side of the sheet is made), to the printer unit 214, the image data set as the image of the fixing process stabilization chart (or information indicative of no image) is sent with specification of single-sided printing. Due to this, the fixing process stabilization chart is output in the number of output sheets set in the single-sided printing.

Figure 10:
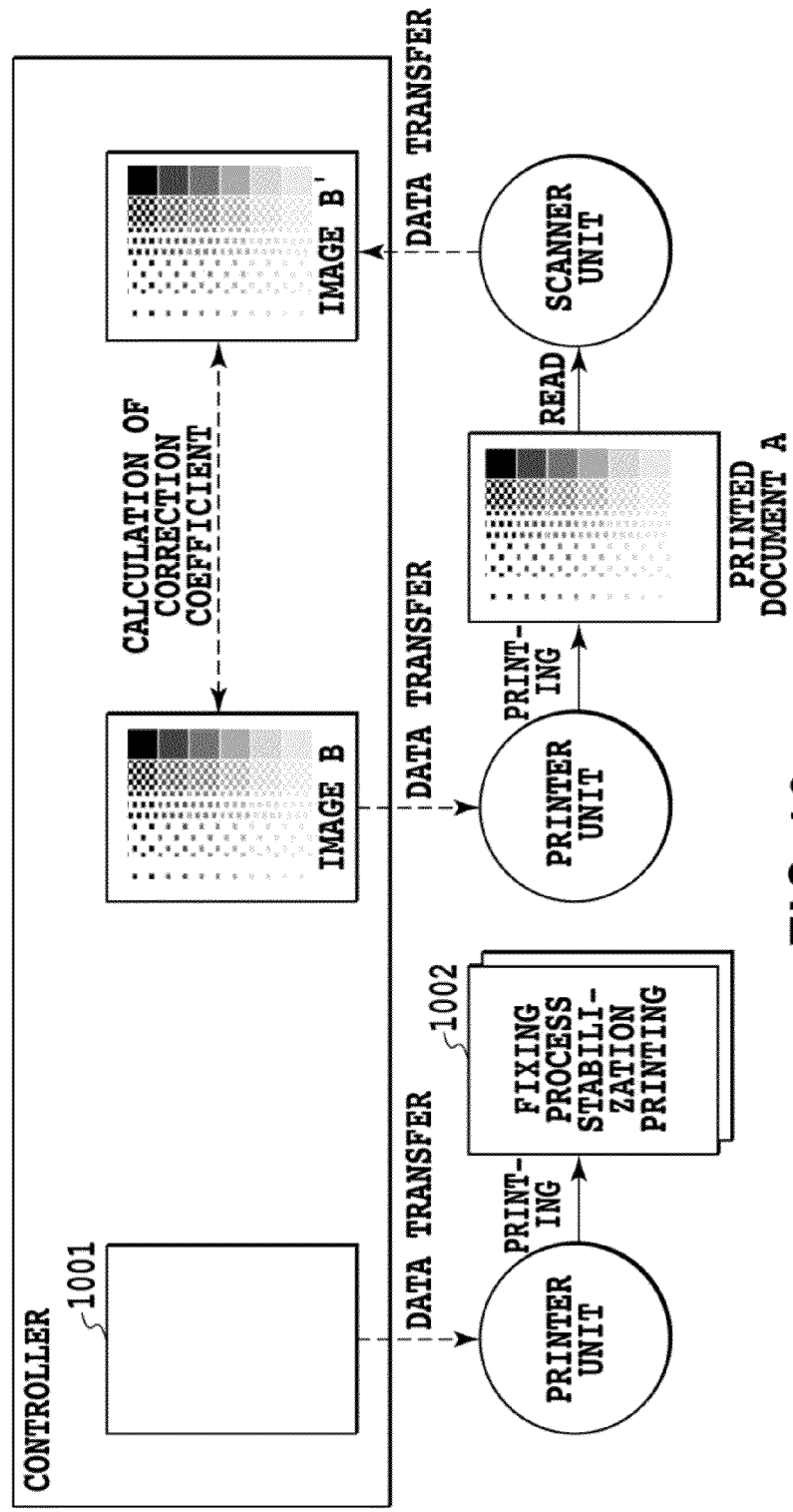
FIG. 10 is a conceptual diagram of automatic gradation correction when no image is set as an image of the fixing process stabilization chart.

As a result of the above setting processing, when "no image" is set at step 910, a white (blank) sheet is output in the printing processing of the fixing process stabilization chart (step 805). FIG. 10 is a diagram showing the way of automatic gradation correction when no image is set. Information 1001 indicative of "no image" is sent to the printer unit 214 from the controller as the image of the fixing process stabilization chart and as a result of the printing processing being performed a specified number of times (at least one or more) set in advance, a white sheet 1002 is output. In this case, by passing the sheet (white sheet) onto which no image is transferred through the fixing unit, the temperature of the fixing unit is stabilized as a result.

Figure 11:
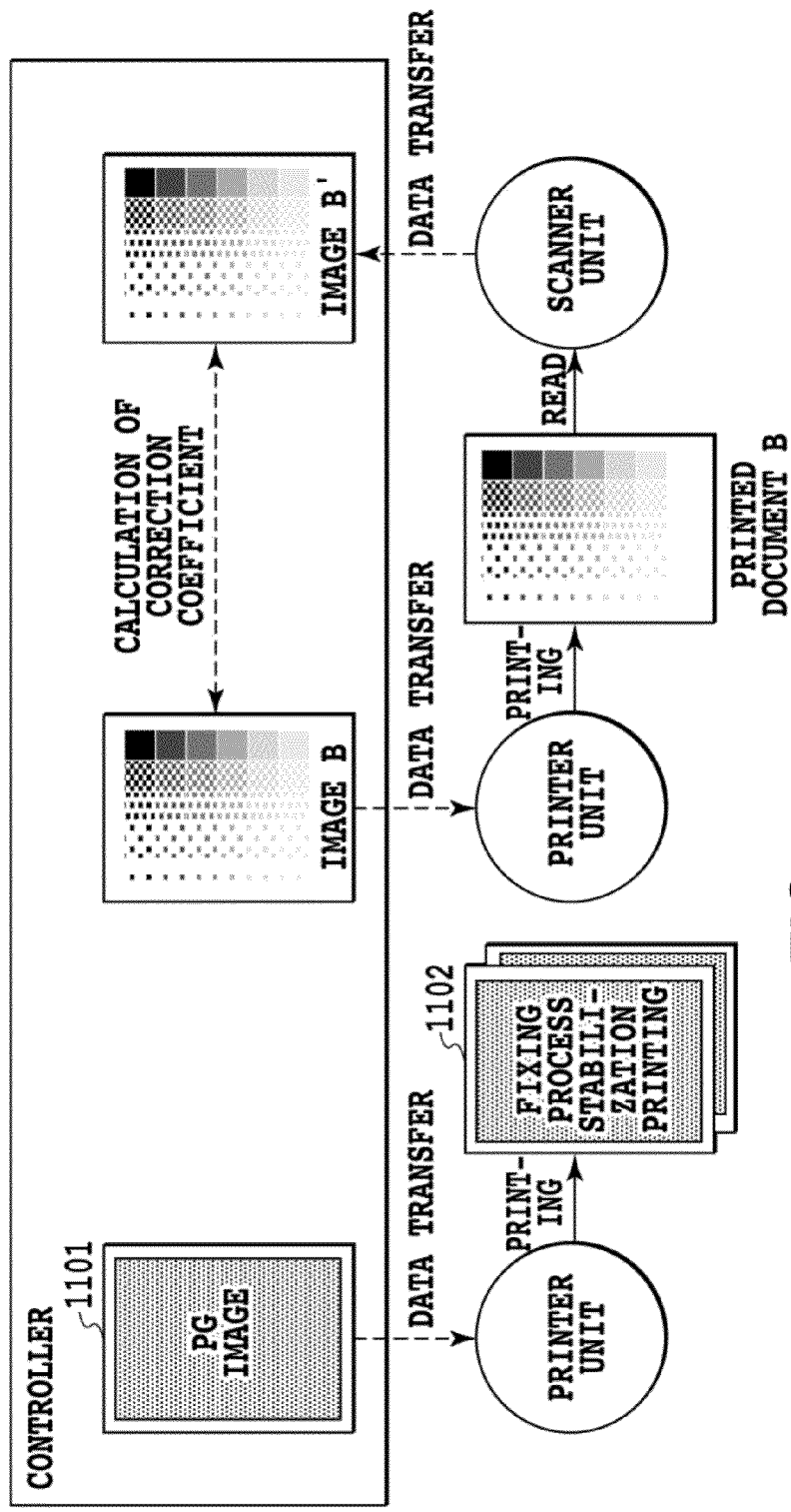
FIG. 11 is a conceptual diagram of automatic gradation correction when a predetermined image is set as an image of the fixing process stabilization chart.

Further, when the image corresponding to the PG number is set at step 911, in the printing processing of the fixing process stabilization chart (step 805), a predetermined image is transferred and then the sheet having been subjected to fixing is output. FIG. 11 is a diagram showing the way of automatic gradation correction when a predetermined image 1101 is set as the image of the fixing process stabilization chart. The predetermined image 1101 set as the fixing process stabilization chart is sent to the printer unit 214 from the controller and as a result of the printing processing being performed a specified number of times (at least one or more) set in advance, a sheet 1102 on which the image is printed is output. In this case, bypassing the sheet onto which the image is transferred through the fixing unit, the temperature of the fixing unit is stabilized as a result.

As described above, according to the present embodiment, when the stabilization processing is necessary at the time of automatic gradation correction, it is made possible to perform the processing efficiently without using a wasteful resource (sheet or toner).

Further, by producing a display relating to the printing processing of the fixing process stabilization chart, it is made possible to easily discriminate it from the printing processing of the gradation measurement chart.

The present invention also provides (in which the reference numbers are exemplary and non-limiting) an image forming apparatus comprising:

a unit configured to transfer a toner image based on image data onto a sheet, to pass the sheet through a fixing unit, and to output a first chart (S607);

a unit configured to create a conversion table for gradation correction using a value obtained by reading the output first chart (S613); and a stabilization processing unit configured to stabilize the fixing unit by outputting a second chart before outputting the first chart in a case where creation of the conversion table for gradation correction is instructed (S605), wherein the stabilization processing unit outputs the second chart in a number of sheets specified in advance by a user. Preferably the image forming apparatus further comprises a display unit configured to produce a display to prompt a user to use the second chart that is output last of the second charts as the first chart in a case where the second chart is formed by using the same image data as that of the first chart. Preferably, in the second chart, an image determined in advance is formed.

Preferably, in the second chart, no image is formed.

Preferably the image used to form the second chart is an image that is able to be formed with an amount of toner less than that of the first chart.

Preferably the sheet used to output the second chart is the sheet that is of the same type as that used in a case where outputting the first chart.

Preferably, the sheet used to output the second chart is a recycled paper.

Preferably the number of sheets specified in advance is set via a user interface screen on which the upper limit value of the number of sheets that is able to be set is displayed.

Preferably the image forming apparatus further comprises a display unit configured to display the number of sheets of the second chart that has already been output in a case where the second chart is output.

Preferably the stabilization processing unit forms the image on both sides or on one side of the sheet in accordance with the output setting in a case where outputting the second chart.

The present also provides (in which the reference numbers are exemplary and non-limiting) a method for an image forming, comprising the steps of:

transferring a toner image based on image data onto a sheet, passing the sheet through a fixing unit, and outputting a first chart (S607);

creating a conversion table for gradation correction using a value obtained by reading the output first chart (S613); and stabilizing the fixing unit by outputting a second chart before outputting the first chart in a case where creation of the conversion table for gradation correction is instructed (S605), wherein the stabilizing step outputs the second chart in a number of sheets specified in advance by a user.

Preferably the method further comprises the step of producing a display to prompt a user to use the second chart that is output last of the second charts as the first chart in a case where the second chart is formed by using the same image data as that of the first chart.

Preferably in the second chart, an image determined in advance is formed.

Preferably in the second chart, no image is formed.

Preferably the image used to form the second chart is an image that is able to be formed with an amount of toner less than that of the first chart.

Preferably the sheet used to output the second chart is the sheet that is of the same type as that used in a case where outputting the first chart.

Preferably the sheet used to output the second chart is a recycled paper.

Preferably the number of sheets specified in advance is set via a user interface screen on which the upper limit value of the number of sheets that is able to be set is displayed.

Preferably the method further comprises the step of displaying the number of sheets of the second chart that has already been output in a case where the second chart is output.

Preferably the stabilizing step forms the image on both sides or on one side of the sheet in accordance with the output setting in a case where outputting the second chart.

The present invention also provides a program stored in a non-transitory computer readable storage medium for causing a computer to perform the method set out above.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer, for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2011-281690, filed Dec. 22, 2011 and 2012-242714, filed Nov. 2, 2012 which are hereby incorporated by reference herein in their entirety.

What is claimed is:

1. An image forming apparatus comprising:
a sheet storage unit configured to store sheets;
a transfer unit configured to transfer a toner image, based on image data, onto a sheet from the sheet storage unit;
a fixing unit configured to fix the toner image onto the sheet;
a conveying unit configured to convey sheets, from the sheet storage unit, through the fixing unit;
an outputting unit configured to output the sheet with the image formed thereupon as a first chart;
a creating unit configured to create a conversion table for gradation correction using a value obtained by reading the output first chart; and
a stabilization control unit configured to perform, in response to instructions from a user to create the conversion table for gradation correction, stabilization control to stabilize the fixing temperature of the fixing unit by performing control to cause the conveying unit to convey a number of sheets through the fixing unit,
wherein the stabilization control unit controls to output the number of sheets predetermined by the user to stabilize the fixing unit,
the outputting unit outputs the first chart after the output of the predetermined number of sheets, and
the stabilization control unit is arranged to perform control of the transfer unit such that an image, determined in advance, is formed on each of the predetermined number of sheets to form a second chart.

2. The image forming apparatus according to claim 1, wherein the toner image formed as the second chart is the same as the toner image formed as the first chart.

3. The image forming apparatus according to claim 1, wherein
the stabilization control unit is arranged to perform control such that no image is formed on the predetermined number of sheets used in stabilization control.

4. The image forming apparatus according to claim 1, wherein
the image used to form the second chart is formed with an amount of toner less than that used to form the image formed as the first chart.

5. The image forming apparatus according to claim 1, wherein
the predetermined number of sheets used in stabilization control are of the same type as the sheet used for the first chart.

6. The image forming apparatus according to claim 1, wherein
the predetermined number of sheets used in stabilization control are recycled paper sheets.

7. The image forming apparatus according to claim 1, Further comprising a display unit.

8. The image forming apparatus according to claim 7, wherein
the display unit is arranged to display a user interface screen via which the predetermined number of sheets can be specified in advance by the user and wherein the display unit is arranged to display an upper limit value of the predetermined number of sheets that can be set.

9. The image forming apparatus according to claim 7, wherein the display unit is configured to display the number of sheets that have already been output during stabilization control.

10. The image forming apparatus according to claim 7, wherein the display unit is configured to produce a display to prompt the user to use the second chart that is output last of the second charts as the first chart.

11. The image forming apparatus according to claim 1, wherein
the stabilization control unit is arranged to perform control to cause the image to be formed on both sides or on one side of the sheets in accordance with an output setting.

12. A method for performing gradation correction in an image forming apparatus, comprising, in response to instructions from a user to create a conversion table for gradation correction, the steps of:
in a stabilization step, passing a predetermined number of sheets through a fixing unit and outputting the predetermined number of sheets to stabilize the temperature of the fixing unit, wherein the predetermined number of sheets is set in advance by the user;
transferring a toner image based on image data onto a sheet, passing the sheet through the fixing unit, and, after the output of the predetermined number of sheets, outputting the sheet with the image formed thereupon as a first chart; and
creating a conversion table for gradation correction using a value obtained by reading the output first chart,
wherein in the stabilization step an image is formed on the predetermined number of sheets such that a predetermined number of second charts are output.

13. The method according to claim 12, wherein the image formed as each second chart is the same image as formed on the first chart.

14. The method according to claim 12, further comprising a step of producing a display to prompt the user to use the second chart that is output last of the second charts as the first chart.

15. The method according to claim 12, wherein
the predetermined number of sheets output in the stabilization step have no image formed thereupon.

16. The method according to claim 12, wherein
the image used to form the second chart is an image that is able to be formed with an amount of toner less than that of the image used to form the first chart.

17. The method according to claim 12, wherein
the predetermined number of sheets output in the stabilization step are of the same type of sheet as that used for the first chart.

18. The method according to claim 12, wherein
the predetermined number of sheets output in the stabilization step are recycled paper sheets.

19. The method according to claims 12, wherein
the predetermined number of sheets specified in advance is set via a user interface screen on which an upper limit value of the predetermined number of sheets that is able to be set is displayed.

20. The method according to claim 12, further comprising the step of displaying a number of sheets that has already been output in the stabilization step.

21. The method according to claim 12, wherein
in the stabilizing step the image is formed on both sides or on one side of the sheets in accordance with an output setting.

22. A program, stored on a non-transitory, computer-readable storage medium, which on execution by a programmable image forming apparatus causes the image forming apparatus to perform the method according to claim 12.

* * * * *